United States Patent Office 3,496,192
Patented Feb. 17, 1970

3,496,192
PROCESS FOR PREPARING TRIOXANE FROM GASEOUS FORMALDEHYDE
Jakob Ackermann and Angelino Landone, Milan, Italy, assignors to Societá Italiana Resine S.p.A., Milan, Italy
Filed Apr. 3, 1967, Ser. No. 627,760
Claims priority, application Italy, Apr. 8, 1966, 8,520/66
Int. Cl. C07d *19/00*
U.S. Cl. 260—340                        3 Claims

ABSTRACT OF THE DISCLOSURE

A process of preparing trioxane by the trimerisation of formaldehyde in the presence of a catalyst. The catalyst is a cation exchange resin modified by treatment with a neutral salt, an acid water soluble salt or a mixture of a free acid with a neutral salt. The salts are preferably those of elements of group II or IV of the Periodic Table of elements and may be those of mineral acids or strong organic acids. The process may be continuously operated or batch wise.

---

Figure 1:
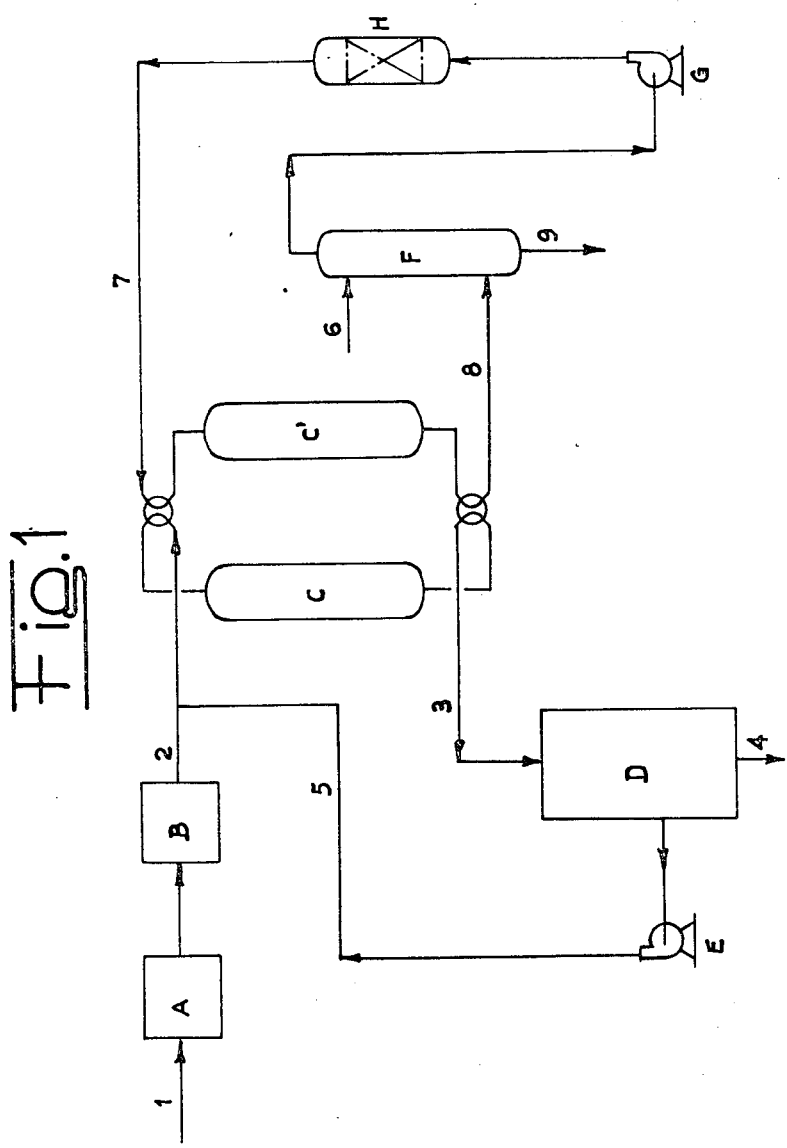

The invention relates to the preparation of trioxane (cyclic trimer of formaldehyde) from monomeric formaldehyde.

Trioxane is the raw material for preparing polyformaldehyde (polyoxymethylenes) and various formaldehyde copolymers. For this purpose the trioxane should be anhydrous and free from impurities, such as formic acid, methanol, water and other compounds.

Raw gaseous formaldehyde is currently obtained by cracking of commercial paraformaldehyde. This raw formaldehyde can be purified by contacting it with an ion exchange resin in solid form, such as of the polystyrene and polyphenol type with carboxylic or sulphonic terminal groups. A purifying method of this kind is disclosed in U.S. patent specification No. 3,118,747 and is based on the absorption of impurities by the resin. Another method is disclosed in U.S. patent specification No. 3,184,900 wherein the cationic resin is, however, employed in its salified form with an alkali or earth-alkali salt, obtained by neutralising the resin with an excess alkali carbonate or hydroxide in an aqueous solution in accordance with the known technique of salification of an acid compound by means of an alkali compound.

It has now been found that by causing gaseous monomeric formaldehyde to flow over a cationic resin prepared in a particular manner, an effluent results which contains substantial trioxane proportions.

According to the present invention we provide a process for preparing trioxane comprising trimerising formaldehyde in the presence of a catalyst comprising an ion exchange resin of the acid type which has been treated with neutral or acid water soluble salt or a mixture of a neutral salt and a free acid.

Suitable salts for the purposes of the invention are the salts of the elements of the I-A, II-A, II-B, III-A, III-B, IV-A, IV-B and VIII groups of the Periodical System, particularly of the elements of the II and IV groups. The acid group of the said salts may derive from mineral acid or a strong organic acid, such as hydrochloric, sulphuric, phosphoric, nitric, formic, acetic salt, chloroacetic and sulphonic acids such as benzensulphonic and toluensulphonic acid. So, by way of example, KCl, NaHSO$_4$, MgCl$_2$ are suitable salts and a large number of other acids are suitable for the purpose.

Particularly suitable resins are the widely known cationic resins obtained by copolymerization to pellet form of styrene with a divinyl monomer, such as divinyl benzene. Treatment of the acid resin is effected by contacting it with an aqueous solution of the selected neutral or acid salt, the solution being acidified if desired and thus containing free acid. During treatment the metal ions of the salt are substituted for the H$^+$ ions in the resin setting free the acid corresponding to the acid of the salt employed; for instance, in the case of KCl hydrochloric acid is set free. Operation is generally carried out at room temperature; however, it is possible to operate at temperatures down to 0° C. approximately or at temperatures up to 50° C. or more depending on the resin used. An excess salt (10–20%) over its stoichiometric quantity is advantageously employed.

Treatment should be carried out so that the treated resin still contains at least about 0.5% of its initial functional acid groups, preferably 1–2% at least. This may be ascertained, for instance, by the method of analysis described by Helfferich—"Ion Exchange"—McGraw-Hill, 1962, pages 92–93. For the sake of satisfactory trioxane yields, the ratio of the salified functional groups to the residual acid groups should not be below 1.

Surprisingly, by employing the acid resin treated with an alkali salt, i.e. with a salt the aqueous solution of which gives an alkali pH, no trioxane is obtained; a similarly negative result is obtained with fully acid resin and with mixtures of acid resin with resin treated by means of alkali salts. Conversely, according to a further aspect of the invention, trioxane by useful proportions can be obtained by employing cationic resins which have been previously fully salified, then partly desalified by means of one of the acids recited herein. When the resin is treated with a salt solution containing free acid, such as a solution of magnesium chloride+hydrochloric acid, the molar ratio of the acid to the salt in the solution should not exceed 1:1.

Resin treatment can be carried out in the same reactor, such as of the column type employed for trimerization, or in a separate apparatus. In any case, the conditioned resin should be subsequently thoroughly washed with deionized water, then dried, as will be further described hereafter. The trimerization reaction temperature may range within rather wide limits, of about 50° to about 150° C. The preferred temperature ranges between 80° C. and 120° C. Though the pressure is not critical, operation is advantageously carried out at atmospheric or super-atmospheric pressure, since reaction takes place with a considerable reduction in volume and is therefore promoted by a rise in pressure. However, it should be borne in mind that when operating at high pressures it becomes increasingly difficult to maintain the temperature under control, that is, to remove the reaction heat. Operation at atmospheric pressure is therefore preferred.

It should be pointed out at this stage that the resin treated according to the invention acts as trimerization catalyst and additionally absorbs impurities (water, methanol, formic acid) contained in the gaseous monomeric formaldehyde stream, so that the effluent contains in practice trioxane and untreated formaldehyde only, so that the latter can be recovered and recycled to the trimerization reaction without any further purification, the resulting trioxane being on the other hand of very high purity. However, the resin thus becomes gradually enriched with said impurities and should therefore be regenerated, which may be carried out in a manner described by the two prior abovementioned Italian patents. In industrial practice of the invention, the raw formaldehyde stream is therefore preferably caused to flow through a purifying apparatus according to one of the two abovementioned patents, thereafter to the trimerization reactors to which the non-trimerized pure formaldehyde is recycled.

The raw gaseous monomeric formaldehyde may be obtained from various sources, known per se such as the previously mentioned parformaldehyde, alpha-polyoxymethylene, polyformaldehyde of high molecular weight, commercial formalin, concentrated formalin, hemiformals of low volatility alcohols, such as cyclohexyl-hemiformal and dihemiformal of the tetraethylglycol.

Since the trimerization of the present invention is a reaction in a gaseous phase in the presence of an acid catalyst, the catalytic system may be of the stationary bed, moveable bed or fluidized bed type in accordance with well known principles. When the raw monomeric formaldehyde stream is previously purified as mentioned above, the catalytic system according to the invention is maintained fully effective during very long periods (full months), in this case, a stationary bed is conveniently adopted. Conversely, when the catalytic system is also used to purify the formaldehyde feed, it may be more convenient to operate in a moveable or fluidized bed, the catalyst being continuously regenerated.

The invention will now be further described by means of the following examples.

EXAMPLES 1 AND 2

These examples compare the catalytic activity in respect of trimerization of the same type of acid cationic resin salified in a previously known manner (resin A) and salified in accordance with the invention (resin B).

Resin A

Two liters of a commercial resin of a polystyrene-divinylbenzene type with sulphonic functional groups were charged to a column 1 m. in height and 6.5 cm. in bore designed for treatment of ion exchange resins. After adding pure water and removing gas bubbles 9 l. 5% wt. KOH solution, the 8 l. demineralized water were caused to slowly flow through the column. The period of flow of the KOH solution was 90 minutes and of the water 60 minutes. Washing with water was continued till a neutral solution left the column. The resin was then removed from the column, filtered to remove most of the water and dried at 100° C. The analysis showed that the resin contained a percentage in an acid form lower than 0.3%.

Resin B

Two liters of the same commercial resin mentioned above were charged to the same column as employed for preparing resin A. After flowing two liters water therethrough and removing gas bubbles from the resin, 19 l. of a solution containing 4% potassium chloride and 0.2% hydrochloric acid, then 10 l. demineralized water were caused to slowly flow through the column. The period of flow for the solution and water was 150 minutes and 70 minutes, respectively. Washing with demineralized water was pursued till the solution issuing from the column did not cloud silver nitrate solution. The resin was discharged from the column, filtered and dried at 100° C. The analysis showed the resin to contain 5% terminal groups in an acid form.

Two tests were carried out in the same manner employing resin A (Example 1) and resin B (Example 2) respectively in the following manner.

A glass column 1.5 m. in height and 3 cm. in bore, equipped with a jacket for hot oil circulation was filled with the dry resin. A dry nitrogen stream was caused to flow downwardly through the resin while oil at 150° C. was circulated in the jacket. After three hours the moisture on issue from the column sank to 0.04%. The oil circulating through the jacket was heated to 100° C., the nitrogen stream being replaced after 15 minutes by a gaseous formaldehyde stream of the following composition:

| | Percent |
|---|---|
| Formaldehyde | 94 |
| Water | 5 |
| Formic acid, methanol, methylformate, etc | 1 |

The gaseous formaldehyde was obtained by decomposition of 250 g. paraformaldehyde at 150–160° C. Decomposition was carried out to yield a regular gaseous formaldehyde stream and is completed after 100 minutes.

The decomposition apparatus for paraformaldehyde was connected to the glass column by a pipe for the flow of formaldehyde and this pipe and the outlet pipes from the column were electrically heated to avoid polymerization of the formaldehyde and deposit of trioxane therein.

The gas issuing from the column was absorbed in three gas scrubbing bottles connected in series and containing water. On completion of decomposition nitrogen was passed through the apparatus for a further 5 minutes in order to remove any formaldehyde still in the column, whereupon the trioxane and formaldehyde content in the water in the three bottles is determined. Formaldehyde was determined by titrating by the soduim sulphide method, trioxane being determined by gas chromatographic analysis. The following results were obtained.

TABLE I

| | Example 1 (resin A) | Example 2 (resin B) |
|---|---|---|
| Formaldehyde, g | 225 | 189 |
| Trioxane, g | Below 0.5% | 35 |

EXAMPLES 3–6

Catalysts according to the invention were prepared as described in Example 2 (resin B) and comprised an acid resin treated by salts of earth alkali elements.

The following table summarizes the composition by weight and volumes by liters of the solutions which were used to treat 2 liters of the acid form of the resin, and also the percentage of the resin remaining in the acid form found by the analysis of the resulting dry product.

TABLE 2

| Example No. | Treating solution | | Acid form |
|---|---|---|---|
| | Volume | Composition | |
| 3 | | Untreated | 100 |
| 4 | 100 | Calcium chloride 0.2% Calcium hydroxide 0.12% | 0.5 |
| 5 | 12 | Calcium chloride 4% Hydrochloric acid 3% | 14 |
| 6 | 12 | Magnesium sulphate | 4 |

Each of the catalysts prepared as above was charged to a stainless steel column provided with a jacket for circulating heating oil. The tube bore was 2.7 cm., the bed height being 100 cm. A dry nitrogen stream was caused to flow at a rate of 2 l/min. downwardly through the column, heating oil at 160° C. being circulated through the jacket.

When the moisture of the nitrogen on issue from the column sank to 0.02% the temperature of the circulating oil was adjusted to about 110° C., the nitrogen stream being replaced after ten minutes by gaseous formaldehyde from the decomposition of the paraformaldehyde at 150–175° C. The purity of paraformaldehyde was 98.5%, the balance being essentially water chemically bound as polyoxymethylenglycol. Decomposition was controlled so that 110 g. paraformaldehyde evaporate within 50 minutes. The gaseous mixture issuing from the steel tube containing the catalyst was conveyed through a set of three U-shaped tubes 2.5 cm. in bore and 20 cm. in height. The U-tubes were immersed in a water-ice bath. The products which were not retained within the U-tubes were conveyed through two water containing washing bottles. The pipes interconnecting the decomposition apparatus, column and U-tubes were heated at 110° C. in order to avoid polymerization and deposition of trioxane, respectively.

A few minutes after the passage of formaldehyde to the column top crystallization of the trioxane in the form of transparent needles in the first U-tube was observed. When all the formaldehyde had passed through a nitrogen stream is passed through for a further 5 minutes and trioxane contained in the U-tubes was weighed and analyzed in order to ascertain its water content by the Karl Fischer method (ASTM–D/1364/58). The formaldehyde in the water in the washing bottles was also analyzed. The following table summarizes in column I the number of the examples, in column II the weight of the resulting trioxane in g., in column III the water content in the trioxane by percent weight and in column IV the weight of the formaldehyde collected in the washing bottles in g. $CH_2O$.

TABLE 3

| I | II | III | IV |
|---|----|-----|-----|
| 3 | 6  | 0.2  | 74 |
| 4 | 22 | 0.03 | 83 |
| 5 | 55 | 0.05 | 45 |
| 6 | 66 | 0.03 | 40 |

EXAMPLE 7

This example explains an industrial process according to the invention with reference to FIG. 1 of the accompanying drawings.

Commercial paraformaldehyde containing 95% $CH_2O$ was fed through pipe 1 to a pyrolysing apparatus A in which the product was converted to gaseous formaldehyde containing water, methanol, formic acid, etc. as impurities. The latter were removed in a purifier B and formaldehyde was obtained which was almost anhydrous and contained methanol and formic acid traces only. The formaldehyde was purified. The purified formaldehyde was charged through pipe 2 to one of the trimerization reactors C, C', the other reactor being at a reactivation stage.

The trimerization reactors contained a cationic exchange resin according to the preceding examples, obtained from its acid form by treatment by means of a 9% calcium chloride and 0.2% hydrochloric acid solution.

The gaseous mixture issuing from the trimerization reactor was conveyed through pipe 3 to a separator D in which trioxane was separated by cooling. The trioxane is discharged through pipe 4. The unreacted gaseous formaldehyde is recycled through pipe 5 by means of a fan E.

The catalyst was periodically reactivated, on ascertaining a decrease in its activity. Reactivation was effected by conveying from pipe 7 a stream of nitrogen heated to 160° C. through the catalyst bed. The stream issuing at 8 from the reactor being reactivated still contained a little formaldehyde, trioxane and the impurities absorbed or formed during trimerization. This nitrogen was first washed with water in the scrubber F, then dried with silica gel in the drier H. A small quantity of cool water was conveyed to the scrubber F. The aqueous solution 9 contained formaldehyde, trioxane and the abovementioned impurities.

The reactors C, C' contained tubes 3 cm. in diameter which were thermostated from the outside by means of a circulating liquid. The liquid temperature during trimerization was maintained at 98° C. and during reactivation at 160° C. The pressure amounted to 1.7 kg./sq. cm. at trimerization and 1.1 kg./sq. cm. on reactivation.

From 100 parts by weight purified formaldehyde 91 parts by weight crystalline trioxane were obtained, melting point 61–63° C. The water content according to the Karl Fischer analysis method was below 0.03%.

EXAMPLE 8

Figure 2:
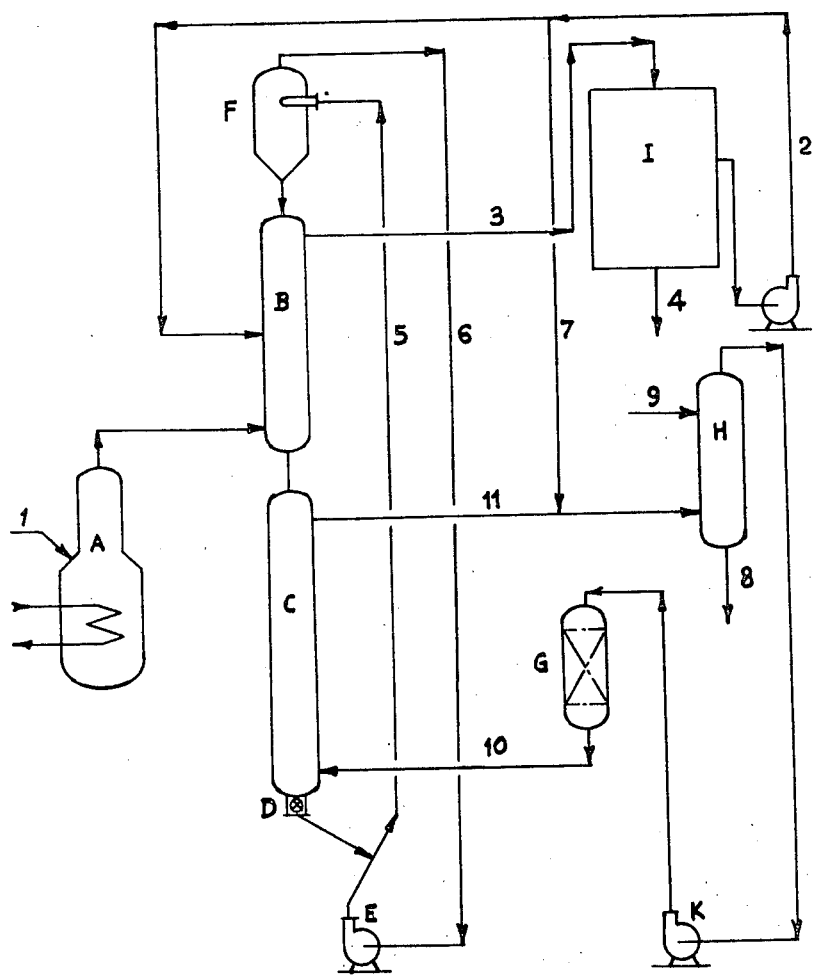

A further embodiment of the invention is shown in FIG. 2 of the accompanying drawing.

An aqueous formalin solution was used with a 50% $CH_2O$ content. Additionally, this formalin still contained 1% methanol and 0.06% formic acid.

The formalin was passed through pipe 1 to the evaporator A. The resulting vapours of the same composition as formalin were supplied to the trimerization column B in which the catalyst was circulated downwardly countercurrent to the gas stream.

The formaldehyde flowed through column B in which it was partially trimerized, and issued at the top as an anhydrous gaseous mixture, it was then supplied through pipe 3 to the separator I in which trioxane was separated in a solid form. Un-reacted formaldehyde was drawn by a fan and recycled to the trimerization column. Thus, a practically full conversion of formaldehyde is achieved.

Regeneration of the catalyst continuously discharged from column B was carried out in the regeneration column C to the bottom of which a dry nitrogen stream is passed through pipe 10. The moisture, a small quantity of formaldehyde and the further impurities removed during regeneration issued from the top of the column C together with the nitrogen through pipe 11. This nitrogen was supplied to the scrubber H fed with cool water through pipe 9. The aqueous solution discharged by scrubber H contained compounds which have been removed by nitrogen from the column C and, additionally, formaldehyde from the drain 7. The drain avoided enriching in the inert recycled gas (nitrogen). This aqueous solution still essentially contained formaldehyde and a small quantity of trioxane, methanol, formic acid, etc. The formaldehyde (concentration 4%) may easily be recovered and recycled to the evaporator A after having been concentrated simply by vacuum distillation at about 30 mm. Hg. The nitrogen leaving scrubber H was dried in column G containing aluminium oxide, this drier actually comprising two columns, one of which was being regenerated. The activated and regenerated catalyst issued at the bottom of column C, was measured by the device D, such as a star valve and was pneumatically conveyed through pipe 5 with a nitrogen recycle (fan E to cyclone F). The cyclone then fed the catalyst to the top of the trimerization column. This resulted in a closed cycle of the catalyst avoiding losses. The trimerization column was thermostated by water circulating at 90° C. The pressure on trimerization amounts to 1.3 kg./sq. cm.

The regeneration column C was heated by helium circulation so that the catalyst at the bottom issues at 160–175° C. The average linear rate of the gas in column B was 250 cm./min., in column C 500 cm./min. The dwelling time of the catalyst (magnesium salt containing 1.2% acid form) was 25 minutes in the trimerization column and 75 minutes in the regeneration column at each cycle.

From 100 parts formaldehyde as formalin fed to the pipe 1 60 parts anhydrous trioxane and 35 parts formaldehyde as diluted formalin discharged from the scrubber H were obtained.

The trioxane exceeded 98% purity its water content being lower than 0.03%, the main impurity being polyoxymethylene of high molecular weight.

What we claim is:

1. A process for the preparation of trioxane comprising trimerising gaseous formaldehyde in the presence of a styrene-divinyl benzene copolymer having sulphonic groups which has been treated with a substance selected from the group consisting of neutral salts, acid water-soluble salts and mixtures of neutral salts with at least one free acid, said acid being selected from the group consisting of hydrochloric acid, sulphuric acid, phosphoric acid, nitric acid, formic acid, acetic acid, chloroacetic acids and sulfonic acids, said salts being selected from the group consisting of those of the elements belonging to the group consisting of groups I–A and II–A of the Periodic Table of Elements, at a temperature of from about 50° C. to about 150° C., the ratio of the salified functional groups to the residual acid groups being at least 1, said copolymer still containing at least about 0.5% of the initial functional acid groups present.

2. A process as claimed in claim 1, wherein the treatment of said styrene-divinyl benzene copolymer having sulphonic groups is carried out at ambient temperature.

3. A process as claimed in claim 1, wherein untrimerised gaseous formaldehyde is separated from the formed trioxane and recycled to the trimerisation.

References Cited

UNITED STATES PATENTS

| | | | |
|---|---|---|---|
| 3,347,869 | 10/1967 | Flodin | 260—340 |
| 3,325,513 | 6/1967 | Bamford | 260—340 |
| 3,176,023 | 3/1965 | Yamase | 260—340 |
| 3,201,917 | 8/1965 | Wood | 260—606 X |

NORMA S. MILESTONE, Primary Examiner

U.S. Cl. X.R.

260—2.2